United States Patent
Sathe et al.

(10) Patent No.: US 12,375,948 B2
(45) Date of Patent: Jul. 29, 2025

(54) SINGLE PHYSICAL ACCESS POINT BASED ROAMING TEST SYSTEM

(71) Applicant: HEWLETT PACKARD ENTERPRISE DEVELOPMENT LP, Houston, TX (US)

(72) Inventors: Tejas Sathe, Santa Clara, CA (US); Amogh Guruprasad Deshmukh, Santa Clara, CA (US); Liang-Chih Yuan, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 499 days.

(21) Appl. No.: 17/959,506

(22) Filed: Oct. 4, 2022

(65) Prior Publication Data

US 2024/0114355 A1     Apr. 4, 2024

(51) Int. Cl.
| | |
|---|---|
| *H04W 24/02* | (2009.01) |
| *H04L 41/14* | (2022.01) |
| *H04L 41/40* | (2022.01) |
| *H04W 36/16* | (2009.01) |
| *H04W 52/24* | (2009.01) |

(52) U.S. Cl.
CPC .......... *H04W 24/02* (2013.01); *H04L 41/145* (2013.01); *H04L 41/40* (2022.05); *H04W 36/165* (2013.01); *H04W 52/24* (2013.01)

(58) Field of Classification Search
CPC ... H04W 24/02; H04W 36/165; H04W 52/24; H04W 36/00; H04W 24/06; H04W 84/12; H04W 24/08; H04W 72/0473; H04L 41/145; H04L 41/40; H04L 43/50
USPC ....................................................... 455/432.1
See application file for complete search history.

(56) References Cited

U.S. PATENT DOCUMENTS

| | | | |
|---|---|---|---|
| 7,702,330 B2 | 4/2010 | Alexander et al. | |
| 7,889,663 B1 | 2/2011 | Wright et al. | |
| 8,976,709 B2 * | 3/2015 | Wu | H04L 43/045 370/254 |
| 10,555,167 B2 * | 2/2020 | Hooda | H04L 45/021 |

(Continued)

OTHER PUBLICATIONS

Bhanage, G.D., "Network Virtualization on the Wireless Edge", Oct. 2011, pp. 157.

*Primary Examiner* — Don N Vo
(74) *Attorney, Agent, or Firm* — Sheppard Mullin Richter & Hampton LLP

(57) ABSTRACT

Examples provide new roaming test systems for network deployments that can be implemented remotely using a single physical AP. Examples achieve this elegant system by emulating a physical network deployment using a group of VAPs provisioned on the single physical AP (a VAP may refer to a logical or a virtual AP instance on a physical AP). Each VAP of CAP group may be configured to represent a physical AP of the physical network deployment (such a network deployment may be a prospective deployment or, an actual/set-up deployment). Examples can simulate/emulate a wireless client physically moving between physical APs of the network deployment by varying transmission power associated with each VAP as a function of time in a manner that mirrors how a wireless client would perceive transmission power varying for physical APs of the network deployment (represented by the VAPs) as the wireless client moves across the geographical site of the network deployment.

20 Claims, 8 Drawing Sheets

(56) References Cited

U.S. PATENT DOCUMENTS

| | | |
|---|---|---|
| 11,271,671 B2 | 3/2022 | Stephenson et al. |
| 2014/0126466 A1* | 5/2014 | Hamdi .................. H04W 24/02 |
| | | 370/328 |
| 2020/0280837 A1* | 9/2020 | Vaishnavi ............... H04W 8/06 |
| 2021/0105669 A1* | 4/2021 | Witzel .................. H04L 67/568 |
| 2022/0369145 A1* | 11/2022 | Park ........................ H04W 8/02 |

* cited by examiner

SINGLE PHYSICAL ACCESS POINT BASED ROAMING TEST SYSTEM

BACKGROUND

A wireless access point (referred to herein as a "physical AP") is a network device that allows wireless client devices to connect to a wireless local area network (WLAN). Enterprise deployments (i.e., network deployments of one or more WLANs across a large geographical area, typically associated with a single business/enterprise such as a large corporate office, airport, hospital, etc.) include multiple physical APs strategically located across the enterprise. Multiple physical APs are generally required for enterprise deployments because the strength of wireless signals transmitted and received by physical APs decreases as the wireless signals travel through space (this phenomenon is sometimes referred to as path loss or transmission power loss). In other words, because of path loss, a given physical AP will have a limited usable range. Thus, enterprise deployments utilize multiple physical APs located in different physical locations to effectively cover/support the larger physical area of an enterprise.

Roaming occurs when a wireless client device moves outside the usable range of one physical AP and connects to another physical AP.

BRIEF DESCRIPTION OF THE DRAWINGS

The present disclosure, in accordance with one or more various examples, is described in detail with reference to the following figures. The figures are provided for purposes of illustration only and merely depict typical or examples.

Figure 1:
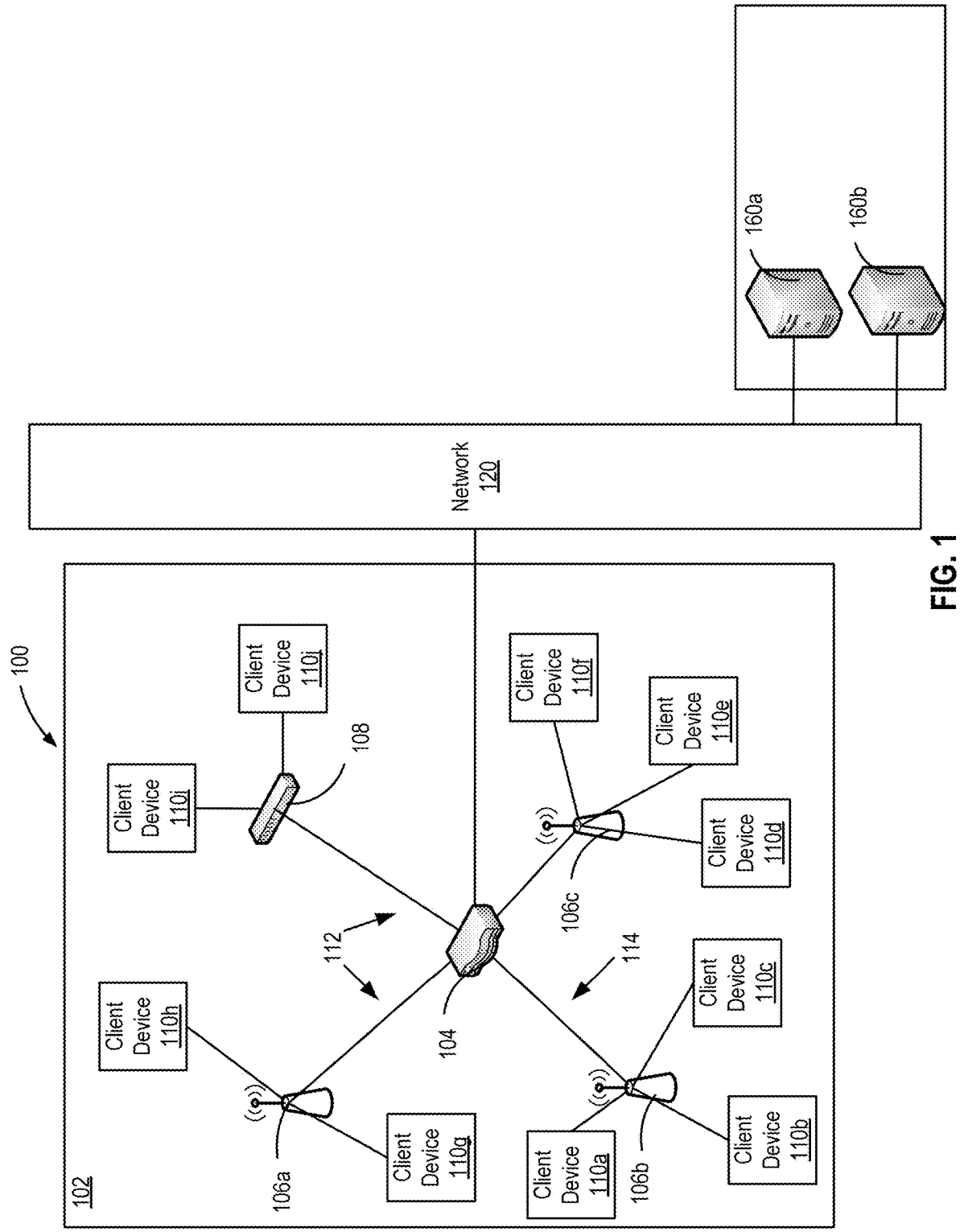
FIG. 1 illustrates an example network deployment.

The figures are not exhaustive and do not limit the present disclosure to the precise form disclosed.

DETAILED DESCRIPTION

With the rapid adoption of trends like bring-your-own-device (BYOD), a seamless roaming experience for wireless client devices is imperative in enterprise deployments. Thus, there is a strong need for reliable systems for testing roaming scenarios within enterprise (and other WLAN) deployments.

Many conventional roaming test systems rely on a human or robot physically moving between physical APs of a network deployment in order to test/simulate roaming scenarios within the network deployment. While generally effective, this manual process can be expensive and time consuming, especially for testing larger network deployments (e.g., enterprise deployments across large geographical sites). Moreover, because these systems rely on a physical resource (i.e., a human or robot) physically moving between deployed physical APs, the systems are difficult/impossible to implement remotely, and are generally not very scalable. Again, this is because: (a) the physical moving resource (i.e., the human or robot) must be present at a geographical site during testing; and (b) the multiple physical APs of a network deployment must be actually set-up/deployed at the geographical site.

Other existing roaming test systems (which may not require a physical resource moving between physical APs) test/simulate roaming scenarios using expensive hardware/test equipment to modify transmission power for physical APs of a network deployment. To implement these systems, expensive (and not easily portable) physical resources (e.g., attenuators, radio frequency shield boxes, power supplies, cabling, test beds and other testing equipment, lab space, etc.) must be located at the geographical site of the network deployment during testing. Relatedly, these systems rely on multiple physical APs actually being set-up/deployed at the geographical site. Thus, like the other conventional systems described above, these systems are difficult/impossible to implement remotely, and are generally not very scalable.

As described above, conventional roaming test systems are generally: (a) expensive to set-up and implement; (b) difficult/impossible to implement remotely; (c) not easily scalable; and (d) require multiple physical APs to be actually set-up/deployed in order to adequately test roaming scenarios. Regarding point (d), conventional roaming test systems are largely unable to test/trouble-shoot prospective network deployments (i.e., planned network deployments that have not yet been set-up/deployed) without actually setting-up/deploying the prospective network deployments prior to testing. This can result in time delays and added costs, especially when a network administrator would like to test multiple prospective network deployments prior to selecting a deployment for final provisioning.

Against this backdrop, examples of the presently disclosed technology provide new roaming test systems for network deployments that can be implemented remotely using a single physical AP. Examples achieve this elegant system by emulating a physical network deployment using a group of VAPs provisioned on the single physical AP (as used herein, a VAP may refer to a logical or a virtual AP instance on a physical AP). Each VAP of the group of VAPs may be configured to represent a physical AP of the physical network deployment (such a network deployment may be a prospective deployment or, an actual/set-up deployment). Examples can simulate/emulate a wireless client physically moving between physical APs of the network deployment by varying transmission power associated with each VAP as a function of time in a manner that mirrors how a wireless client would perceive transmission power varying for each physical AP of the network deployment (represented by the VAPs) as the wireless client moves across the geographical site of the network deployment.

Utilizing VAPs and the techniques described above, examples provide a roaming test system that allows a user/network administrator to: (1) configure a group of VAPs to emulate physical APs of a (physical) network deployment; (2) configure roaming parameters for the group of VAPs (e.g., a type of roaming, a security operations mode, a roaming trigger, etc.); (3) based on the roaming parameter configurations, perform a roaming scenario test using the group of VAPs (as described above, this roaming scenario test may emulate a physical roaming scenario test for the network deployment); and (4) display a result from the roaming scenario test.

Here it should be understood why utilizing VAPs of a single physical AP to test/simulate physical roaming scenarios is a highly unconventional application of VAPs. VAPs are conventionally used to broadcast multiple WLANs from a single physical AP (or multiple WLANs from each one of multiple physical APs). In other words, VAPs of the same physical AP are conventionally used to broadcast multiple WLANs from the same physical location—with the same/similar usable range. Thus, a wireless client will not physically roam between VAPs of the same physical AP. Instead, a transition from one VAP to another VAP (of the same physical AP) would be a transition from one WLAN to another WLAN. Accordingly, it would be unusual/unconventional to associate transitions from one VAP to another VAP with physical/movement-based roaming. Thus, to utilize a group of VAPs of the same physical AP to test/simulate physical roaming scenarios, examples of the presently disclosed technology (1) flip the traditional notion of physical/movement-based roaming from a spatial domain to a time domain; and (2) alter conventional usage/configuration of VAPs.

For instance, examples can emulate a wireless client physically moving between physical APs of a network deployment by varying transmission power for each VAP (representing a physical AP of the network deployment) as a function of time in a manner that mirrors how a wireless client would perceive transmission power varying for each physical AP (represented by the VAPs) as the wireless client moves within the geographical site of the network deployment. Thus, examples leverage the concept of "clockwise roaming"/movement of a clock to emulate "physical roaming"/movement in space.

Examples also alter conventional usage/configuration of VAPs. In particular, examples configure VAPs of a common VAP group to broadcast the same WLAN/SSID (as will be described in greater detail below, in certain cases examples may configure multiple VAP groups where each VAP group is configured to broadcast a unique/different WLAN/SSID). Conventionally, such a configuration would be rather illogical as VAPs were specifically developed to allow a single physical AP to broadcast multiple/different WLANs/SSIDs. However, because examples of the presently disclosed technology utilize VAPs of a single physical AP in an unconventional manner—i.e., to emulate multiple physical APs broadcasting the same WLAN/SSID from different physical locations—it makes sense to configure VAPs of a common VAP group to broadcast the same WLAN/SSID.

As alluded to above, roaming test systems in accordance with the presently disclosed technology provide numerous technical advantages over conventional roaming test systems. For example, roaming test systems in accordance with the presently disclosed technology are generally cheaper and easier to implement than conventional roaming test systems because (a) they do not require a human or robot physically moving from physical AP to physical AP of an already provisioned network deployment; and (b) they do not require expensive (and not easily portable) test equipment to be located on-site during a roaming test. Relatedly, roaming test systems in accordance with the presently disclosed technology can be implemented remotely as they do not require on-site physical resources (other than a single physical AP) during roaming testing. Also, because they do not rely on multiple physical APs being set-up/deployed prior to testing, roaming test systems in accordance with the presently disclosed technology can test/troubleshoot prospective network deployments without ever having to set them up. This can save significant time and cost when e.g., a user/network administrator wants to test/troubleshoot multiple prospective network deployments before selecting a final deployment for provisioning. Due to a reduced reliance on human/physical resources, examples of the presently disclosed technology can also facilitate greater automation for roaming test systems.

Before describing examples of the presently disclosed technology in detail, it is useful to describe how VAPs (and more generally APs) are used in typical network deployments that examples of the presently disclosed technology may be used to test.

As alluded to above, a wireless access point (AP) generally refers to a networking device that allows a wireless client device to connect to a wireless network (e.g., a WLAN). In accordance with the Institute of Electrical and Electronics Engineers (IEEE) 802.11 WLAN standards (which includes Wi-Fi), a service set is a term used to refer to a group of wireless network devices which share a service set identifier (SSID)-typically the natural language label that users see as a network name. A service set forms a logical network of nodes operating with shared link-layer networking parameters. One type of service set, a basic service set (BSS) can refer to a subgroup, within a service set, of devices that share physical-layer medium access characteristics (e.g., radio frequency, modulation scheme, security settings) such that they are wirelessly networked. The BSS is defined by a BSS identifier (BSSID) shared by all devices within it.

APs may advertise WLANs to wireless client devices by sending out beacons and probe responses that contain a WLAN's SSID, as well as, e.g., supported authentication and data rates. When a wireless client device associates to an AP, that wireless client device sends traffic to the AP's BSSID, which typically is the AP's Media Access Control (MAC) address. In some networks, an AP uses a unique BSSID for each WLAN allowing a single, physical AP to support multiple WLANs in a network deployment. As alluded to above, a WLAN configuration applied to a BSSID of an AP can be referred to as a virtual AP (VAP). In other words, a VAP may be thought of as a logical or a virtual AP instance on a physical AP. Conventionally, VAPs or VAP profiles are configured to provide different network access or services to users on/across the same physical network deployment. For example, a first WLAN may be configured to provide access to guest users and a second WLAN can be configured to provide access to employee users through the same AP(s). Each of the first and second WLAN configurations applied to different BSSIDs result in first and second VAPs. For example, the first VAP can be configured to offer open authentication and Captive Portal access with basic rates of up to 1 Mbps, while the second VAP can be configured to require WPA authentication with basic rates of up to 11 Mbps.

As described above, to utilize a group of VAPs of the same physical AP to test/simulate physical roaming scenarios, examples (1) flip the traditional notion of physical/ movement-based roaming from a spatial domain to a time domain; and (2) alter conventional usage/configuration of VAPs.

For instance, examples can emulate a wireless client physically moving between physical APs of a network deployment by varying transmission power for VAPs as a function of time in a manner that mirrors how a wireless client would perceive transmission power varying for each physical AP (represented by the VAPs) as the wireless client moves within the geographical site of the network deployment. Thus, examples leverage the concept of "clockwise roaming"/movement of a clock to emulate "physical roaming"/movement in space.

Examples also alter conventional usage/configuration of VAPs. In particular, examples configure VAPs of a common group of VAPs to broadcast the same WLAN/SSID. Conventionally, such a configuration would be rather illogical as VAPs were specifically developed to allow a single physical AP to broadcast multiple/different WLANs/SSIDs. However, because examples of the presently disclosed technology utilize VAPs of a single physical AP in an unconventional manner—i.e., to emulate multiple physical APs broadcasting the same WLAN/SSID from different physical locations—it makes sense to configure VAPs of a common VAP group to broadcast the same WLAN/SSID.

Again, before describing examples of the presently disclosed technology in detail, it is useful to describe an example network deployment that examples may be used to test.

FIG. 1 illustrates one example of a network deployment 100 that may be implemented for an enterprise/organization, such as a business, educational institution, governmental entity, healthcare facility or other organization. This diagram illustrates an example of a configuration implemented with an organization having multiple users (or at least multiple client devices 110) at a geographical site 102.

The geographical site 102 may include a primary network, which can be, for example, an office network, home network or other network installation. The geographical site 102 network may be a private network, such as a network that may include security and access controls to restrict access to authorized users of the private network. Authorized users may include, for example, employees of a company at geographical site 102, residents of a house, customers at a business, and so on.

In the illustrated example, the geographical site 102 includes a controller 104 in communication with the network 120. The controller 104 may provide communication with the network 120 for the geographical site 102, though it may not be the only point of communication with the network 120 for the geographical site 102. A single controller 104 is illustrated, though the geographical site 102 may include multiple controllers and/or multiple communication points with network 120. In some examples, the controller 104 communicates with the network 120 through a router (not illustrated). In other examples, the controller 104 provides router functionality to the devices in the geographical site 102.

A controller 104 may be operable to configure and manage network devices, such as at the geographical site 102. The controller 104 may be operable to configure and/or manage switches, routers, access points, and/or client devices connected to a network. The controller 104 may itself be, or provide the functionality of, an access point.

The controller 104 may be in communication with one or more switches 108 and/or wireless Access Points (APs) 106a-c. Switches 108 and wireless APs 106a-c provide network connectivity to various client devices 110a-j. Using a connection to a switch 108 or AP 106a-c, a client device 110a-j may access network resources, including other devices on the (geographical site 102) and the network 120.

Examples of client devices may include: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IOT) devices, and the like.

Within the geographical site 102, a switch 108 is included as one example of a point of access to the network established in geographical site 102 for wired client devices 110i-j. Client devices 110i-j may connect to the switch 108 and through the switch 108, may be able to access other devices within the network deployment 100. The client devices 110i-j may also be able to access the network 120, through the switch 108. The client devices 110i-j may communicate with the switch 108 over a wired 112 connection. In the illustrated example, the switch 108 communicates with the controller 104 over a wired 112 connection, though this connection may also be wireless.

Wireless APs 106a-c are included as another example of a point of access to the network established in geographical site 102 for client devices 110a-h. Each of APs 106a-c may be a combination of hardware, software, and/or firmware that is configured to provide wireless network connectivity to wireless client devices 110a-h. In the illustrated example, APs 106a-c can be managed and configured by the controller 104. APs 106a-c communicate with the controller 104 and the network over connections 112, which may be either wired or wireless interfaces.

The network 120 may be a public or private network, such as the Internet, or other communication network to allow connectivity with geographical site 102, as well as access to servers 160a-b. The network 120 may include third-party telecommunication lines, such as phone lines, coaxial cable, fiber optic cables, satellite communications, cellular communications, and the like. The network 120 may include any number of intermediate network devices, such as switches, routers, gateways, servers, and/or controllers, which are not directly part of the network deployment 100 but that facilitate communication between the various parts of the network deployment 100, and between the network deployment 100 and other network-connected entities.

An AP generally refers to a networking device that allows a wireless client device to connect to a wireless network. An AP can include a processor, memory, and I/O interfaces, including wired network interfaces such as IEEE 802.3 Ethernet interfaces, as well as wireless network interfaces such as IEEE 802.11 Wi-Fi interfaces, although examples of the disclosure are not limited to such interfaces. An AP can include memory, including read-write memory (i.e., volatile memory), and a hierarchy of persistent memory (i.e., non-volatile memory) such as ROM, EPROM, and Flash memory. Moreover, as used herein, an AP may refer to receiving points for any known or convenient wireless access technology which may later become known. Specifically, the term AP is not intended to be limited to IEEE 802.11-based APs.

As alluded to above, APs, such as APs 106a-c, are enabled to implement VAPs, namely, support for one or more multiple distinct SSID values over a single AP radio with unique media access control (MAC) addresses per SSID (i.e., BSSID). An SSID may be a field between 0 and 32 octets that can be included as an Information Element (IE) within management frames. In the context of the 802.11 standard, management frames supporting the SSID IE include the beacon, probe request/response, and association/reassociation request frames. An AP can support VAPs using multiple BSSIDs. Typically, a beacon or probe response may contain a single SSID IE. The AP sends beacons for each VAP that it supports at a beacon interval (e.g., 100 ms), using a unique BSSID for each VAP. The AP responds to probe requests for supported SSIDs (including a request for the broadcast SSID) with a probe response including the capabilities corresponding to each BSSID. Typically, an AP may advertise up to a given number (e.g., 16) of beacons, each with a different BSSID to provide the VAP support. Each VAP may have a unique MAC address, and each beacon may have a network name.

Figure 2:
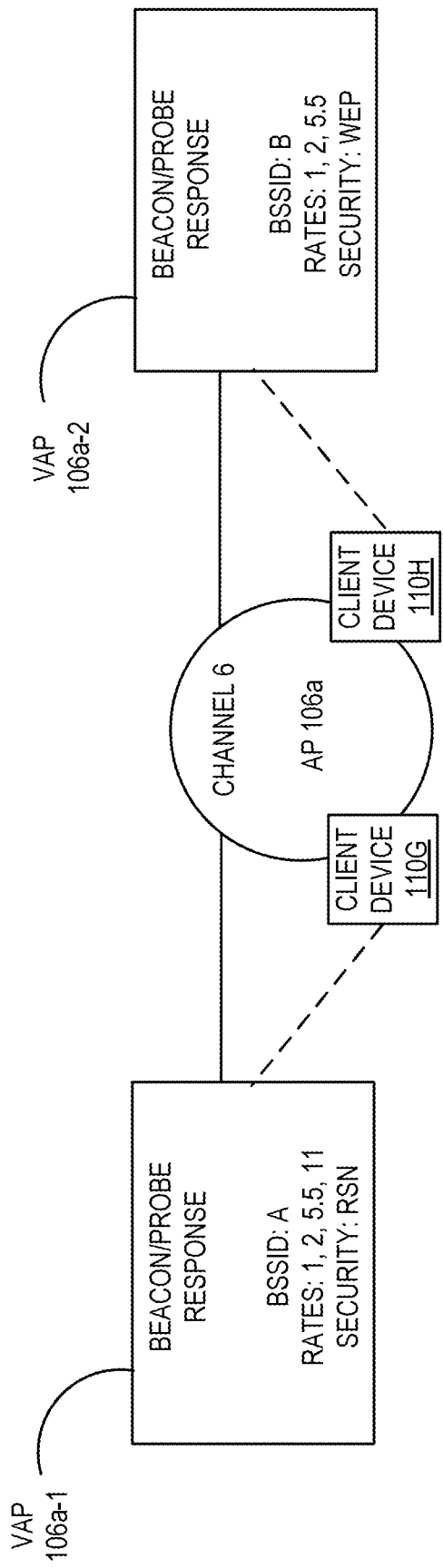
FIG. 2 is companion figure to FIG. 1 that depicts a schematic representation of a multi-virtual AP configured physical AP.

FIG. 2 is a companion figure to FIG. 1 that depicts a schematic representation of a multi-VAP configured AP. Components labelled with common numerical references numbers across FIGS. 1 and 2 may be the same/similar components and will not be described again for the sake of brevity.

AP 106a may be configured to support multiple VAPs 106a-1 and 106a-2. Each of VAP 106a-1 and 106a-2 can emulate the operation of physical AP 106a at the MAC layer. In particular, each of VAP 106a-1 and 106a-2 can emulate the MAC layer behavior of the physical AP 106a by operating with a distinct BSSID (A, B) and, optionally, distinct capability advertisements (e.g., rates 1, 2, 5.5, 11 for BSSID A, and rates 1, 2, 5.5 for BSSID B), and default key sets (RSN for BSSID A and WEP for BSSID B). Each of VAP 106a-1 and 106a-2 may also exhibit distinct application behavior (at the application layer), and be reachable via a distinct domain name (at the IP layer). To provide this support, it is assumed that (1) client devices 110G and 110H can discover the SSIDs, (2) each of VAP 106a-1 and 106a-2 can advertise its own set of capabilities, and (3) each of VAP 106a-1 and 106a-2 can be allocated to a unique WLAN. It should be understood that the number of VAPs can differ, and the example of FIG. 2 is not meant to be limiting.

As described above, to utilize a group of VAPs of the same physical AP to test/simulate physical roaming scenarios, examples (1) flip the traditional notion of physical/movement-based roaming from a spatial domain to a time domain; and (2) significantly alter conventional usage/configuration of VAPs.

For instance, examples can emulate a wireless client physically moving between physical APs of a network deployment by varying transmission power for VAPs as a function of time in a manner that mirrors how a wireless client would perceive transmission power varying for each physical AP (represented by the VAPs) as the wireless client moves within the geographical site of the network deployment. Thus, examples leverage the concept of "clockwise roaming"/movement of a clock to emulate "physical roaming"/movement in space.

Examples also alter conventional usage/configuration of VAPs. In particular, examples configure VAPs of a common VAP group to broadcast the same WLAN/SSID. Conventionally, such a configuration would be rather illogical as VAPs were specifically developed to allow a single physical AP to broadcast multiple/different WLANs/SSIDs. However, because examples of the presently disclosed technology utilize VAPs of a single physical AP in an unconventional manner—i.e., to emulate multiple physical APs broadcasting the same WLAN/SSID from different physical locations—it makes sense to configure VAPs of a common VAP group to broadcast the same WLAN/SSID.

Figure 3:
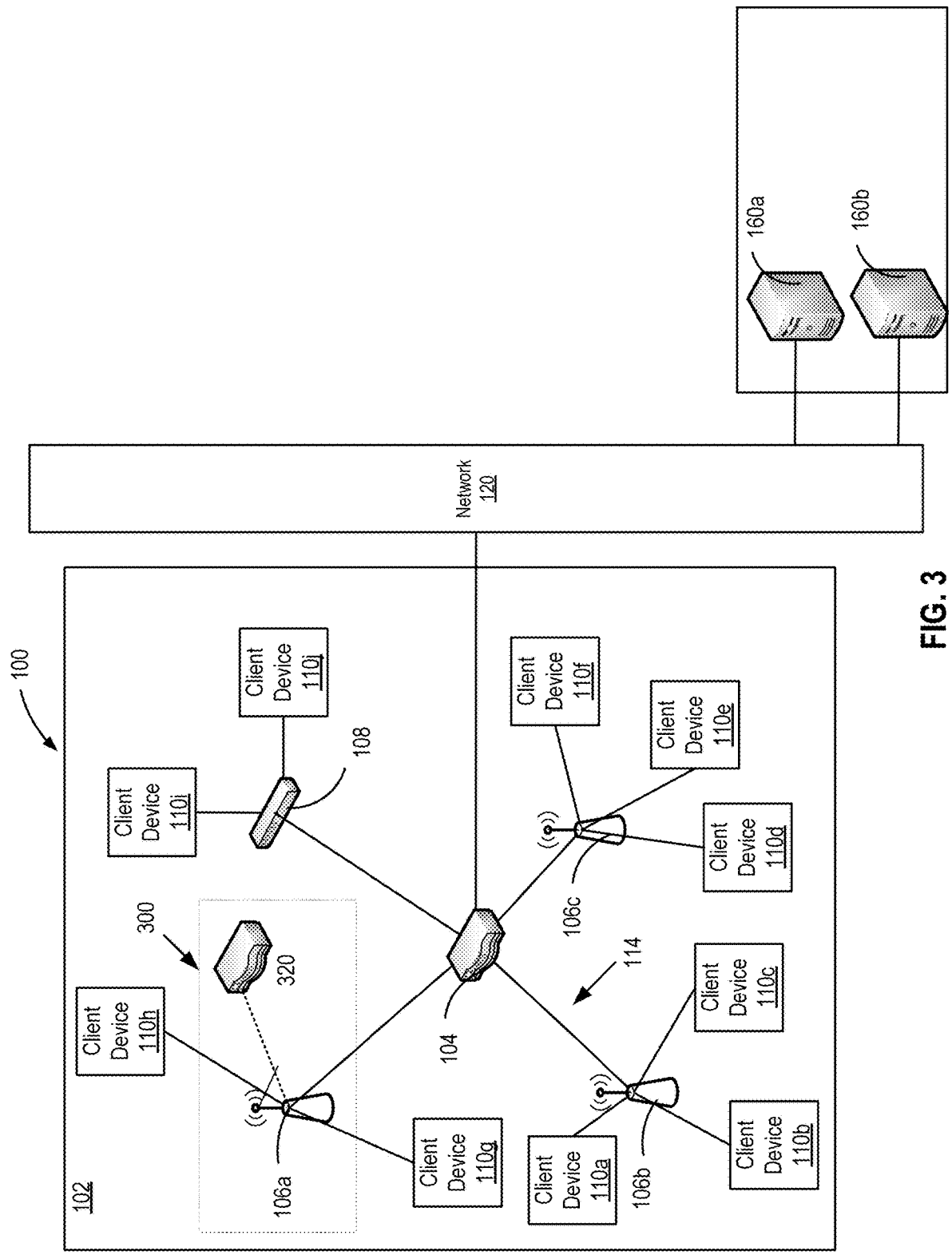
FIG. 3 depicts an example roaming test system, in accordance with various examples of the presently disclosed technology.

FIG. 3 depicts an example roaming test system 300 that can be used to test network deployment 100 from FIGS. 1-2, in accordance with various examples of the presently disclosed technology. Components labelled with common numerical references numbers across FIGS. 1-3 may be the same/similar components and will not be described again for the sake of brevity.

As depicted, roaming test system 300 can be implemented using a single physical AP (i.e., AP 106a). Roaming test system 300 can achieve this elegant system by emulating network deployment 100 using a group of VAPs provisioned on AP 106a. Each VAP of the VAP group may be configured to represent a physical AP of network deployment 100 (i.e., APs 106a-c). Roaming test system 300 can emulate a wireless client device (e.g., wireless client device 110h) physically moving within geographical site 102 (and by extension, roaming between physical APs of network deployment 100) by varying transmission power associated with each VAP of the VAP group as a function of time in a manner that mirrors how the wireless client device would perceive transmission power varying for each physical AP (represented by the VAPs) as the wireless client device moves within geographical site 102.

As depicted, roaming test system 300 comprises AP 106a and a roaming test controller 320 (e.g., an Aruba mobility controller or similar controller used in conjunction with wireless devices). Roaming test controller 320 may be connected to AP 106a via wired or wireless connection. In certain examples, roaming test system 300 may also include a user interface (not depicted) associated with either or both of AP 106a and roaming test controller 320. As will be described below, via the user interface a user can select: (1) a number of VAP groups and a number of VAPs per group to be configured (again, these VAPs and VAP groups can represent/emulate physical APs of network deployment 100); and (2) various roaming parameters (e.g., type of roaming, security operations mode, type of roaming trigger, etc.) for the configured VAP groups (which emulate network deployment 100). Here, a user may select multiple VAP groups to be configured so that users can test multiple roaming scenarios simultaneously. In particular, each VAP group can be set up with unique/separate roaming parameters (e.g., a first set of roaming parameters for a first VAP group, a second set of roaming parameters for a second VAP group, a third set of roaming parameters for a third VAP group, etc.), which allows users to simultaneously test different roaming scenarios (based on the unique/separate roaming parameters) across the different VAP groups.

As alluded to above, multiple VAPs may be provisioned on AP 106a (in various examples, up to 16 VAPs may be provisioned on AP 106a). As described above, examples (in some cases in response to user input) can configure VAPs such that a given VAP is configured to represent a physical AP of network deployment 100. For example, a first VAP (e.g., VAP 106a-1) may be configured to represent AP 106a, a second VAP (e.g., VAP 106a-2) may be configured to represent AP 106b, a third VAP (e.g., VAP 106a-3) may be configured to represent AP 106c, etc. As described above, by strategically varying transmission power as a function of time for these VAPs, examples can emulate a wireless client device (e.g., wireless client device 110*h*) moving within geographical site 102 and roaming between (physical) APs 106*a-c*.

In various examples, roaming test controller 320 may configure the VAPs/VAP groups provisioned on AP 106*a* and/or roaming parameters for the VAPs/VAP groups. In certain examples roaming test controller 320 can be a logical block that resides in AP 106*a*. In some examples either or both of AP 106*a* and roaming test controller 320 may be associated with a user interface/dashboard via wired or wireless connection. As described above, the user interface may allow a user to select: (1) a number of VAP groups and a number of VAPs to be configured (again, these VAPs and VAP groups can represent/emulate physical APs of network deployment 100); and (2) various roaming parameters (e.g., type of roaming, security op-mode, type of roaming trigger, etc.) for the VAP group(s). In these examples, the user interface may be located remotely from geographical site 102. Accordingly, a user may be able to perform roaming scenario tests for network deployment 100 completely remotely and/or automatically (for example the system can be provisioned remotely from a cloud or local connection and the test suite may be automated to conduct multiple test cases in any order). As described above, this feature of roaming test system 300 presents an advantage over conventional roaming test systems which generally require physical presence at the geographical site of a network deployment in order to perform a roaming test. Thus, with a single physical AP, examples of the presently disclosed technology can achieve roaming tests without user presence at the geographical site of a network deployment.

Roaming test system 300 may be used in conjunction with APs (e.g., AP 106*a*) from various different vendors, including Aruba. In various examples, roaming test system 300 may be used in conjunction with APs that support the following: (1) 16 VAPs per AP/per radio, each VAP having its own unique tunnel ID (in case of Campus AP tunnel-based solutions) and unique Layer 2 MAC Address (it may be noted that from a roaming point of view, Layer 3 Datapath treats the individual tunnel IDs equally no matter if they are set up from a single physical AP or multiple physical APs); and (2) one-to-one mapping of a unique VAP profile to a unique SSID profile.

As alluded to above, to effectively replace physical APs with VAPs for roaming scenario tests, roaming test system 300 may implement specialized configurations for AP 106*a* and the VAPs provisioned on AP 106*a*.

For instance, roaming test system 300 can make certain WLAN Driver/Firmware changes to AP 106*a*, based on command line. For example, roaming test system 300 may program transmission power distinctively for each VAP provisioned on wireless AP 106*a* for all AP Downlink (DL) packets. As another example, roaming test system 300 may be able to pause the beacon queue for each VAP and create a beacon loss for a user configurable time. This may be done to lower the transmission power on DL packets as a wireless client decides upon the transmission on uplink (UL). Lowering the transmission power can help degrade the received signal strength indication (RSSI) on the wireless client where the wireless client has a roaming algorithm (to initiate a roam to new AP) which may be based on a RSSI threshold, beacon loss, etc. In certain cases, examples of the presently disclosed technology can even facilitate understanding of the wireless client's roaming algorithm.

Roaming test system 300 can also make profile configuration changes that allow one SSID profile to be applied for all VAPs of a common VAP group provisioned on AP 106*a*.

As described above, such a configuration—which runs contrary to convention—allows the VAP group to emulate a physical network where multiple physical APs broadcast the same SSID/WLAN from different physical locations. Thus each of the VAPs of the VAP group provisioned on AP 106*a* may have unique/different BSSIDs (aka Layer 2 MAC addresses), but the same SSID (sometimes referred to as an ESSID).

As alluded to above, the test equipment required for roaming test system 300 may include one physical AP (i.e., AP 106*a*) and a controller (i.e. roaming test controller 320). In some examples, wireless client devices (e.g., wireless client devices 110*h* and 110*g*) may also be used in the roaming scenario tests conducted by roaming test system 300. Wireless client devices may be used for validation purposes, or to gain a better understanding of wireless client roaming algorithms.

In certain examples, roaming test system 300 may rely on certain assumptions when performing a roaming scenario test. These assumptions may include: (1) that AP 106*a* supports 2.4 GHz, 5 GHz and 6 GHz bands, and up to 16 VAPs/BSSIDs per band (this assumption facilitates a comprehensive multi-band system where there could be 16 VAPs per radio/band constituting a total of 48 VAPs; here having a greater number of VAPs enables a more comprehensive roaming test); (2) that the VAPs have identical SSIDs (as alluded to above, in order to emulate physical roaming from one physical AP to another physical AP, VAPs of the presently disclosed technology broadcast the same SSID); (3) that the VAPs have the same mobility domain (as required for certain specifications such as 802.11r based roaming); and (4) that VAPs under the same Layer 2 network use the same DHCP server and subnet (this may be helpful to emulate different APs on the same subnet).

As described above, via a user interface associated with either or both of AP 106 and roaming test controller 320, a user can select: (1) a number of VAP groups and a number of VAPs to be configured (again, these VAPs and VAP groups can represent/emulate physical APs of network deployment 100); and (2) various roaming parameters (e.g., type of roaming, security op-mode, type of roaming trigger, etc.) for the configured VAP group(s). An example workflow that can be used with such a user interface will be described below in conjunction with FIG. 4.

Figure 4:
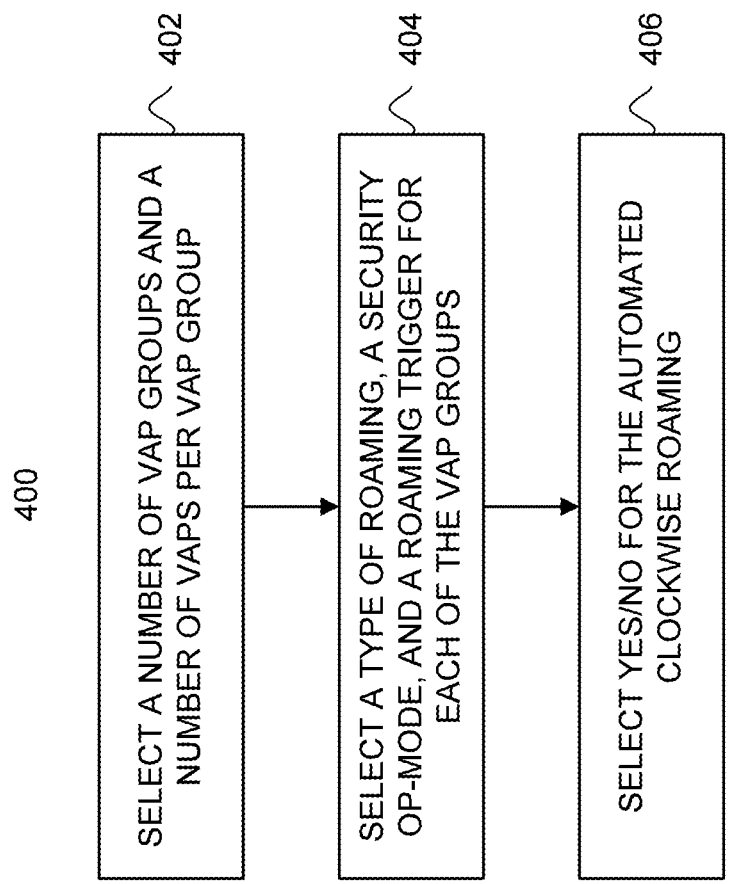
FIG. 4 depicts an example workflow that can be used in conjunction with a user interface of a roaming test system, in accordance with various examples of the presently disclosed technology.

FIG. 4 depicts an example workflow 400 that can be used in conjunction with a user interface of a roaming test system, in accordance with various examples of the presently disclosed technology. Workflow 400, and the user interface associated with workflow 400, may be used in conjunction with roaming test system 300.

As depicted, at operation 402 a user selects a number of VAP groups and a number of VAPs per group to emulate a (physical) network deployment. As described above, each VAP of a VAP group may be configured to represent a physical AP of the network deployment (e.g., network deployment 100).

Here, a user may group the VAPs into "VAP groups" for better test efficiency. As will be described below, this is because the user can select/apply different roaming parameters for each VAP group (i.e., a user may select/apply: a first set of roaming parameters for a first VAP group, a second set of roaming parameters for a second VAP group, etc.). Accordingly, the user can perform different roaming test scenarios concurrently using the different VAP groups (and their associated roaming parameters). For instance, a user may concurrently perform (1) a first roaming scenario test using a first VAP group (with a first set of roaming parameters); (2) a second roaming scenario test using a second VAP group (with a second set of roaming parameters); (3) a third roaming scenario test using a third VAP group (with a third set of roaming parameters); etc. Here, each VAP group may have its own unique mobility domain as required for certain specifications such as 802.11r based roaming.

At operation 404, a user selects a type of roaming, a security operations mode, and a roaming trigger for each of the selected VAP groups.

Examples of roaming types that may be selected include: (a) legacy roaming; (b) opportunistic key caching (OKC); (c) PMKID caching; (d) fast roaming (sometimes referred to as FT roaming or 802.11r roaming); (e) points (a)-(d) with management frame protection (MFP); etc.

Examples of security operations modes that may be selected include: (a) wpa2-psk-aes; (2) wpa3-sae-aes; (3) wpa2-psk-aes; etc.

Examples of roaming triggers that may be selected include: (a) an AP transmission power-based trigger (this may include 802.11v-based roaming triggers where a client device has a choice to transition based on diminishing transmission power); and (2) a beacon loss-based trigger. In certain examples, the roaming trigger may comprise instructing a client device to transition from one VAP to another VAP in accordance with e.g., an 802.11v-based roaming trigger.

Here, a user can select a specific roaming test scenario (i.e., a specific combination of roaming type, security operations mode, and roaming trigger), or an entire roaming test suite with various combinations of roaming and security operations modes. For example, a user may select/apply: (1) a first combination of roaming parameters for a first VAP group (e.g., wpa2-psk-aes+FT and an AP transmission power-based roaming trigger); (2) a second combination of roaming parameters for a second VAP group (e.g., wpa3-sae-aes+MBO+PMKID caching and a beacon loss-based trigger); (3) a third combination of roaming parameters for a third VAP group (e.g., wpa2-psk-aes+OKC+MFP and a 802.11v-based trigger); and (4) a fourth combination of roaming parameters for a fourth VAP group (e.g., wpa2-psk-aes+FT and an AP transmission power-based trigger).

At operation 406, a user selects yes or no for automated clockwise roaming. In various examples the user may make this selection by VAP group.

As alluded to above, and as will be described in greater detail in conjunction with FIG. 5, automated clockwise roaming involves varying transmission power (or in some cases beacon loss values) associated with each configured VAP as a function of time in a manner that mirrors how a wireless client would perceive transmission power (or in some cases beacon loss) varying for physical APs (represented by the VAPs) as the wireless client moves within a geographical location of a network deployment.

Here, a user may select "no" for automated clockwise roaming if the user only desires to perform a spot-check for a particular roaming scenario. In other words, selecting "no" for automated clockwise roaming would be analogous to a conventional roaming test system varying transmission power or beacon loss for multiple physical APs to spot-check a roaming scenario instead of having a human or robot physically moving between the physical APs to test the roaming scenario.

Figure 5:
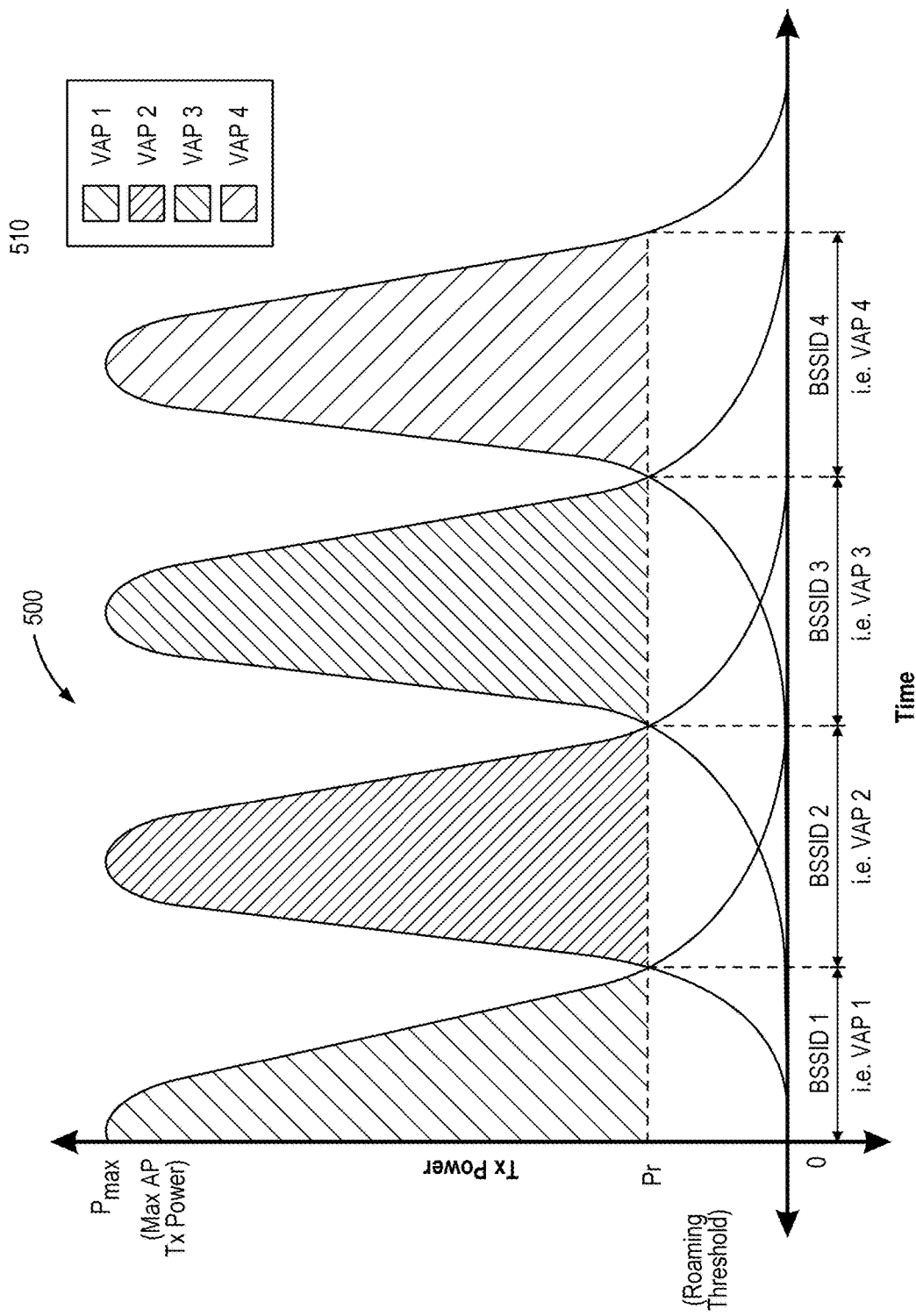
FIG. 5 depicts an example graph that illustrates automated clockwise roaming for a group of virtual APs (VAPs), in accordance with various examples of the presently disclosed technology.
Figure 6:
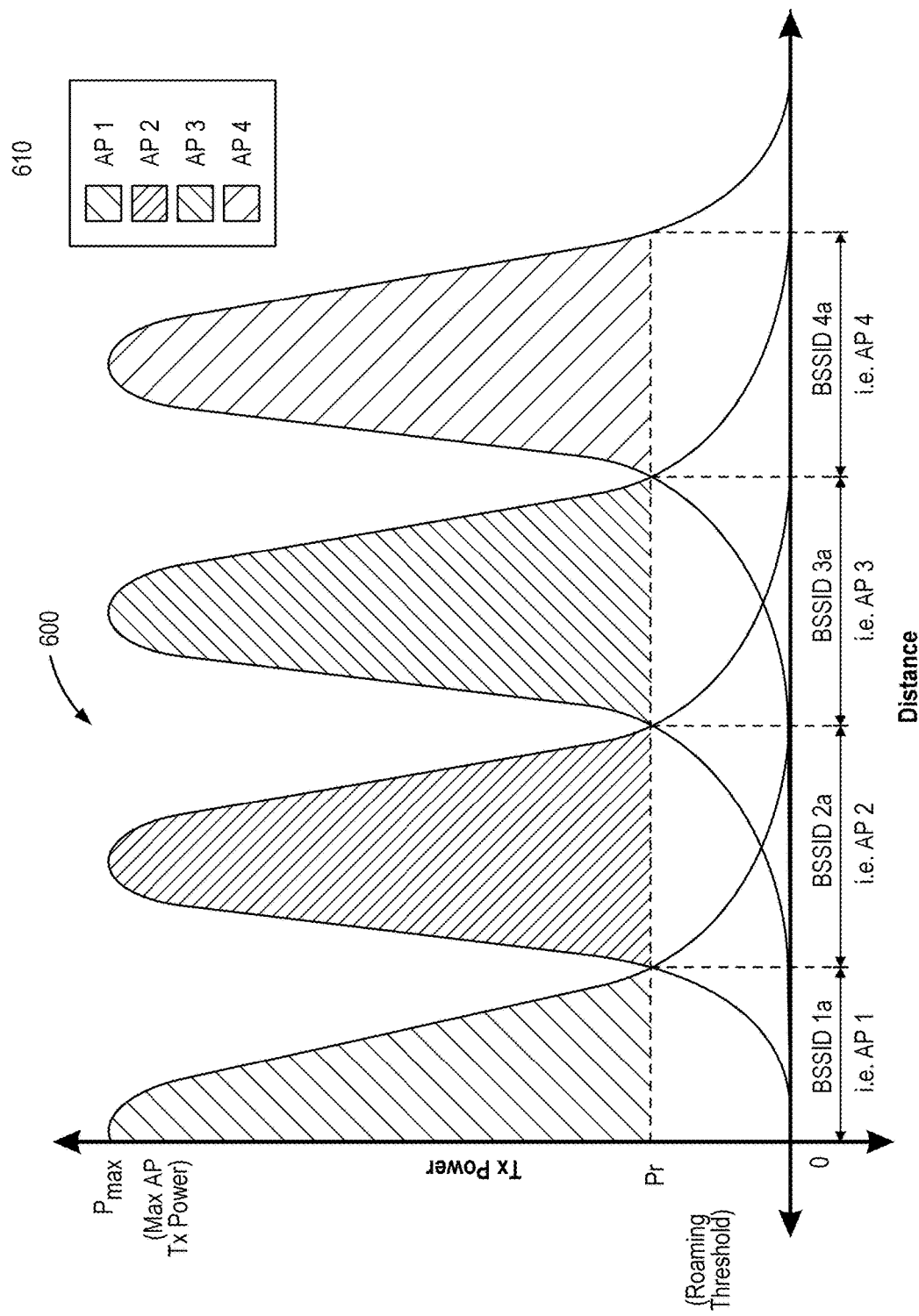
FIG. 6 is a companion figure to FIG. 5 that depicts an example graph that illustrates physical roaming within a network deployment.

FIG. 5 depicts an example graph 500 that illustrates automated clockwise roaming for a group of VAPs 510, in accordance with various examples of the presently disclosed technology. FIG. 6 is a companion figure to FIG. 5 that depicts an example graph 600 that illustrates physical roaming within a network deployment 610. Here, the group of VAPs 510 may emulate network deployment 610.

As depicted, graph 500 illustrates transmission (Tx) power for (downlink) DL packets as a function of time for four VAPs (i.e., VAP 1, VAP 2, VAP 3, and VAP 4) of the group of VAPs 510. As depicted, each of VAPs 1-4 is associated with a unique BSSID (i.e., BSSID 1 for VAP 1, BSSID 2 for VAP 2, etc.).

Graph 600 of FIG. 6 looks very similar to graph 500, but with a few key differences. In particular, graph 600 illustrates transmission (Tx) power for DL packets as a function of distance for four physical APs (i.e., AP 1, AP 2, AP 3, and AP 4) of network deployment 610. As depicted, each (physical) AP is associated with a unique BSSID (i.e., BSSID 1a for AP 1, BSSID 2a for AP 2, etc.). Here, VAP 1 of the group of VAPs 510 may be configured to represent AP 1 of network deployment 610, VAP 2 of the group of VAPs 510 may be configured to represent AP 2 of network deployment 610, VAP 3 of the group of VAPs 510 may be configured to represent AP 3 of network deployment 610, etc.

As depicted, using e.g., an automated clockwise roaming algorithm, examples of the presently disclosed technology can emulate a physical roaming scenario within network deployment 610 (i.e., physical movement/roaming between physical APs of network deployment 610) by varying transmission power (for DL packets) as a function of time for VAPs of the group of VAPs 510. As described above, in the physical roaming scenario, a wireless client device will perceive varying transmission power for DL packets sent by each of the physical APs of network deployment 610 as a function of distance/physical movement. In the automated clockwise roaming scenario introduced by examples of the presently disclosed technology, a wireless client device will perceive varying transmission power for DL packets sent by each of the VAPs of the group of VAPs 510 as a function of time/clock movement. Here, examples can adapt the automated clockwise roaming scenario of FIG. 5 based on the geographical locations of physical APs within network deployment 610. For example, depending on where AP 1 and AP 2 are located relative to each other, examples can adjust how the transmission power for DL packets sent by VAP 1 varies in time relative to the transmission power for DL packets sent by VAP 2.

In the simplified example depicted in conjunction with FIG. 5, at the start (i.e., time=0), a maximum allowed transmission power (e.g. 18 dBm) is set on VAP 1 and very low transmission powers (e.g. 0 dBm) are set on VAPs 2-4. Through an automated script, as time progresses, transmission power on VAP 1 is gradually reduced to 0 dBm while transmission power on VAP 2 is increased from 0 dBm to the maximum allowed transmission power, and so on. As described above, each of VAPs 1-4 may be configured to have different transmission powers such that the group of VAPs 510 effectively emulates network deployment 610. As depicted in FIG. 5, as time continues to progress, the transmission power for VAPs 1-4 all eventually go to 0 dBm. Here, this may emulate a Wi-Fi to cellular handoff for network deployment 610 (i.e., it may emulate when a wireless client device physically leaves the usable range of network deployment 610). Examples can also emulate a Wi-Fi to cellular handoff by diminishing the transmission power for all VAPs of the group of VAPs 510 to 0 dBm.

In various instances, instead of adjusting/varying transmission power as a function of time for VAPs 1-4, examples may adjust/vary beacon loss values for VAPs 1-4 as a function of time in order to e.g., emulate a roaming scenario within network deployment 610 based on beacon loss instead of transmission power loss. Beacon loss may be introduced by having a given VAP transmit a fewer number of beacons per unit time to towards 0 (i.e. no SSID seen). In general, wireless clients have thresholds for reading beacons per unit time. So when a beacon rate is reduced below a wireless client's threshold rate, the client will have to transition/roam from one BSS to another.

Figure 7:
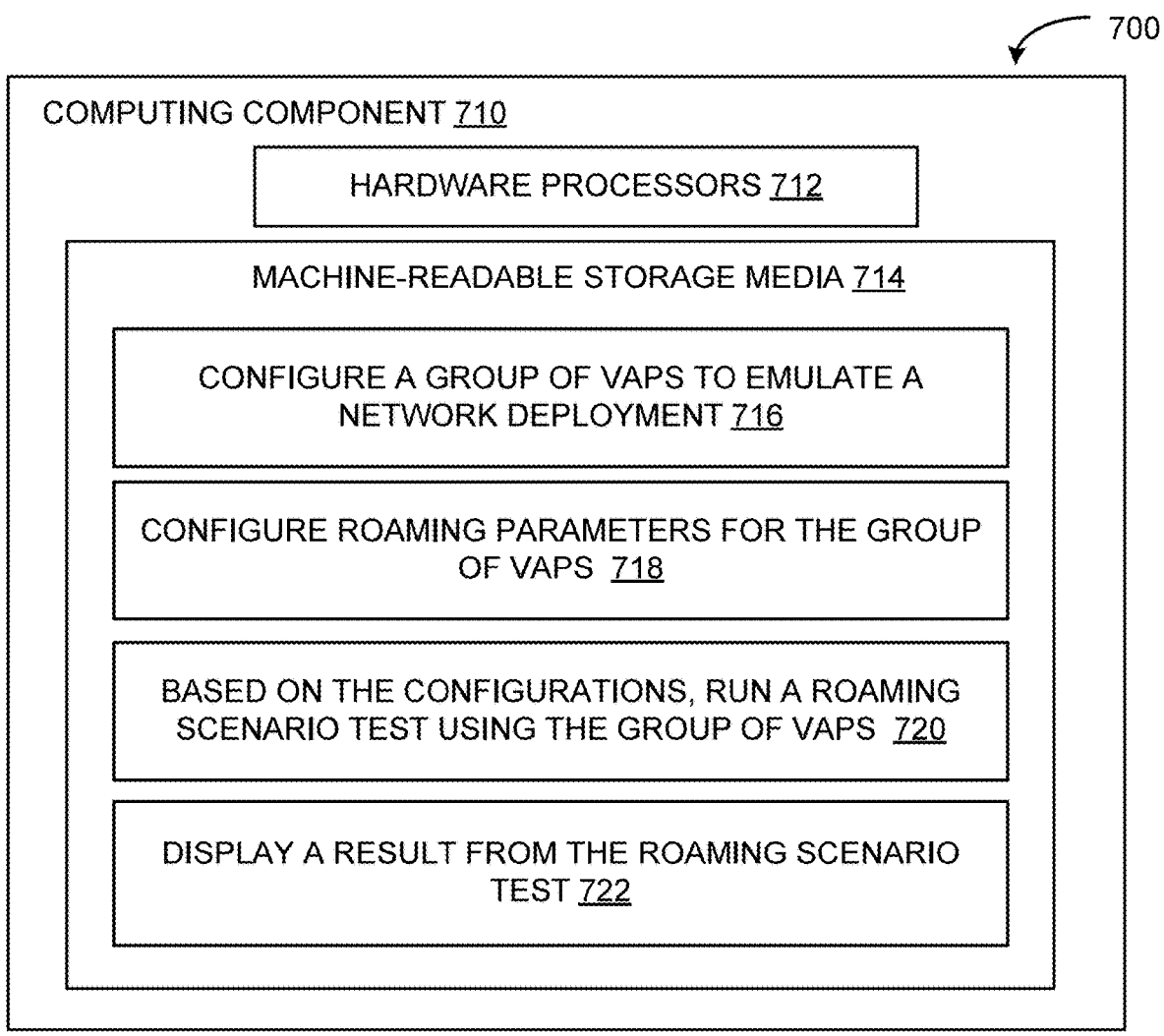
FIG. 7 depicts an example computing system that can be used to perform a roaming scenario test using a group of VAPs, in accordance with various examples of the presently disclosed technology.

FIG. 7 depicts an example computing system 700 that may be used to perform a roaming scenario test using a group of VAPs (or generally a plurality of VAPs) configured to emulate a network deployment, in accordance with various examples of the presently disclosed technology.

Referring now to FIG. 7, computing component 710 may be, for example, a server computer, a controller, or any other similar computing component capable of processing data. In the example implementation of FIG. 7, the computing component 710 includes a hardware processor 712, and machine-readable storage medium for 714.

Hardware processor 712 may be one or more central processing units (CPUs), semiconductor-based microprocessors, and/or other hardware devices suitable for retrieval and execution of instructions stored in machine-readable storage medium 714. Hardware processor 712 may fetch, decode, and execute instructions, such as instructions 716-722, to control processes or operations for burst preloading for available bandwidth estimation. As an alternative or in addition to retrieving and executing instructions, hardware processor 712 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 714, may be any electronic, magnetic, optical, or other physical storage device that contains or stores executable instructions. Thus, machine-readable storage medium 714 may be, for example, Random Access Memory (RAM), non-volatile RAM (NVRAM), an Electrically Erasable Programmable Read-Only Memory (EEPROM), a storage device, an optical disc, and the like. In some examples, machine-readable storage medium 714 may be a non-transitory storage medium, where the term "non-transitory" does not encompass transitory propagating indicators. As described in detail below, machine-readable storage medium 714 may be encoded with executable instructions, for example, instructions 716-722.

As described above, computing system 700 may be used to perform a roaming scenario test using a group of VAPs (or generally a plurality of VAPs), in accordance with various examples of the presently disclosed technology.

Accordingly, hardware processor 712 executes instruction 716 to configure a group of VAPs to emulate a (physical) network deployment.

As described above, the group of VAPs may emulate a network deployment comprising a plurality of physical APs located across a geographical site. Accordingly, a given VAP may be configured to represent a given physical AP (including its geographical location) within the network deployment. For example, a first VAP of the group of VAPs may be configured to represent a first physical AP of the network deployment, a second VAP of the group of VAPs may be configured to represent a second physical AP of the network deployment, etc. As described above, the group of VAPs may be logical APs provisioned on a single physical AP of the network deployment.

In various examples, the group of VAPs may emulate a prospective network deployment (i.e., a network deployment which has not been deployed/set-up, or completely deployed/set-up yet). Accordingly, a given VAP may represent a prospective physical AP deployed at a prospective location of the geographical site. As described above, because roaming test systems implemented in accordance with the presently disclosed technology do not rely on multiple physical APs being set-up/deployed prior to testing, they can test/troubleshoot prospective deployments without ever having to set them up. This can save significant time and cost when e.g., a user/network administrator wants to test/troubleshoot multiple prospective network deployments before selecting a deployment for final provisioning. Examples can also gain a better understanding of wireless client side roaming algorithms and roaming thresholds.

As described above, hardware processor 712 can configure the group of VAPs to broadcast the same service set identifier (SSID)— sometimes also referred to as an extended SSID (ESSID). This may correspond to each VAP broadcasting the same WLAN. As described above, this type of configuration is opposite to convention where VAPs provisioned on the same physical AP are configured to broadcast different SSIDs/WLANs. Here, hardware processor 712 may configure the VAPs of the group of VAPs to broadcast the same SSID/WLAN to emulate the plurality of physical APs of the (emulated) network deployment broadcasting the same SSID/WLAN from different geographical locations. Hardware processor 712 can also configure the VAPs of the group of VAPs to have unique/different basic same service set identifiers (BSSIDs) (i.e., a first BSSID for a first VAP, a second BSSID for a second VAP, etc.). Accordingly, a wireless client device may perceive each VAP of the group of VAPs as if they were separate physical APs—which generally also have unique BSSIDs. In certain examples, hardware processor 712 may also configure each VAP to have its own unique tunnel ID (e.g., in the case of Campus AP tunnel-based solutions).

In various examples, hardware processor 712 may configure multiple VAP groups to emulate the network deployment (e.g., a first VAP group, a second VAP group, etc.). As described above, hardware processor 712 may configure multiple VAP groups for better test efficiency/multi-user testing. This is because hardware processor 712 can apply different roaming parameters to each VAP group, and then concurrently perform different roaming test scenario tests on each of the VAP groups having the different roaming parameters applied to them. For instance, hardware processor 712 can concurrently perform (1) a first roaming scenario test (having a first set of roaming parameters) using a first VAP group; (2) a second roaming scenario test (having a second set of roaming parameters) using a second VAP group; (3) a third roaming scenario test (having a third set of roaming parameters) using a third VAP group; etc.

In some examples, hardware processor 712 may configure the group of VAPs in response to user input. For example, as described above, a user may select a number of VAP groups and a number of VAPs per VAP group. Hardware processor 712 can then configure the selected number of VAP groups/VAPs to emulate the network deployment.

Hardware processor 712 executes instruction 718 to configure roaming parameters for the VAP group. In certain examples, hardware processor 712 may execute this configuration in response to user input.

Hardware processor 712 can configure various types of roaming parameters for the group of VAPs. For example, hardware processor 712 can configure (1) a roaming type; (2) a security operations mode; and (3) a roaming trigger.

Examples of roaming types that may be configured include: (a) legacy roaming; (b) opportunistic key caching (OKC); (c) PMKID caching; (d) fast roaming (sometimes referred to as FT roaming or 802.11r roaming); (e) points (a)-(d) with management frame protection (MFP); etc.

Examples of security-op modes that may be configured include: (a) wpa2-psk-aes; (2) wpa3-sae-aes; (3) wpa2-psk-aes; etc.

Examples of roaming triggers that may be configured include: (a) an AP transmission power-based trigger (this may include 802.11v-based roaming triggers where a client device has a choice to transition based on diminishing transmission power); and (2) a beacon loss-based trigger. In certain examples, the roaming trigger may comprise instructing a client device to transition from one VAP to another VAP in accordance with e.g., an 802.11v-based roaming trigger.

As described above, in certain examples hardware processor 712 can configure a different set of roaming parameters for different VAP groups. For example, hardware processor can configure: (1) a first set of roaming parameters for a first VAP group; (2) a second set of roaming parameters for a second VAP group; (3) a third set of roaming parameters for a third VAP group; etc. Hardware processor 712 can then concurrently perform different roaming scenario tests using the VAP groups based on the (different) sets of roaming parameters applied to them. This may increase test efficiency by performing multiple roaming scenario tests in approximately the amount of time it takes to perform a single roaming scenario test.

Based on the roaming parameter configurations described in conjunction with instruction 718, hardware processor 712 executes instruction 720 to perform a roaming scenario test using the group of VAPs.

As described above, in examples where different sets of configured roaming parameters are applied to different VAP groups, hardware processor 712 may perform multiple roaming scenario tests concurrently. For instance, hardware processor 712 can concurrently perform (1) a first roaming scenario test (having a first set of roaming parameters) using a first VAP group; (2) a second roaming scenario test (having a second set of roaming parameters) using a second VAP group; (3) a third roaming scenario test (having a third set of roaming parameters) using a third VAP group; etc. As described above, performing multiple roaming scenario tests concurrently can increase test efficiency because multiple roaming scenarios can be tested in approximately the amount of time it takes to perform a single roaming scenario test.

As described above, in certain examples performing the roaming scenario test using the group of VAPs may comprise varying transmission power over time for at least one of the VAPs of the group of VAPs to emulate a client device moving location relative to locations of physical APs of the network deployment (in certain examples transmission power may be varied over time for each of the VAPs of the group of VAPs). Such "automated clockwise roaming" was described in detail in conjunction with FIGS. 5-6.

In various instances, instead of varying transmission power over time for at least one of the VAPs of the group of VAPs, hardware processor 712 can vary beacon loss over time in order to emulate a client device moving location relative to locations of physical APs of the network deployment. Beacon loss may be introduced by having a given VAP transmit a fewer number of beacons per unit time to towards 0 (i.e. no SSID seen). In general, wireless clients have thresholds for reading beacons per unit time. So when a beacon rate is reduced below a wireless client's threshold rate, the client will have to transition/roam from one BSS to another.

Hardware processor 712 executes instruction 722 to display a result from the roaming scenario test(s). Alternatively, in certain examples hardware processor 712 may provide a result from the roaming scenario test(s) to a user interface/graphical user interface where the test results can be displayed for a user.

Figure 8:
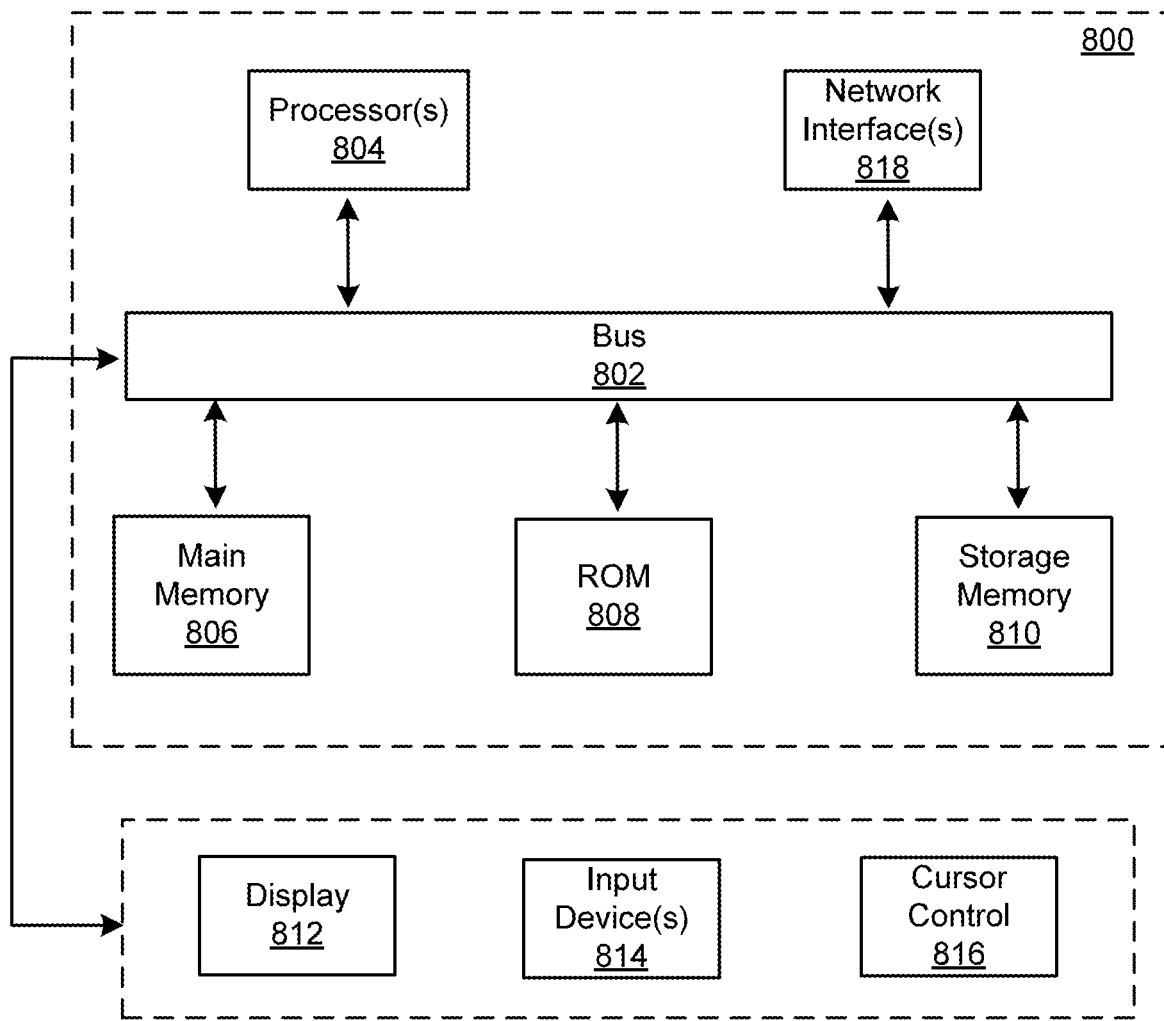
FIG. 8 depicts a block diagram of an example computer system in which various of the examples described herein may be implemented.

FIG. 8 depicts a block diagram of an example computer system 800 in which various of the embodiments described herein may be implemented. The computer system 800 includes a bus 802 or other communication mechanism for communicating information, one or more hardware processors 804 coupled with bus 802 for processing information. Hardware processor(s) 804 may be, for example, one or more general purpose microprocessors.

The computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

The computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

The computer system 800 may be coupled via bus 802 to a display 812, such as a liquid crystal display (LCD) (or touch screen), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. In some embodiments, the same direction information and command selections as cursor control may be implemented via receiving touches on a touch screen without a cursor.

The computing system 800 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 802. Transmission media can also take the form of acoustic or light waves, such as those generated during radio-wave and infra-red data communications.

The computer system 800 also includes a communication interface 818 coupled to bus 802. Network interface 818 provides a two-way data communication coupling to one or more network links that are connected to one or more local networks. For example, communication interface 818 may be an integrated services digital network (ISDN) card, cable modem, satellite modem, or a modem to provide a data communication connection to a corresponding type of telephone line. As another example, network interface 818 may be a local area network (LAN) card to provide a data communication connection to a compatible LAN (or WAN component to communicated with a WAN). Wireless links may also be implemented. In any such implementation, network interface 818 sends and receives electrical, electromagnetic or optical indicators that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical indicators that carry digital data streams. The indicators through the various networks and the indicators on network link and through communication interface 818, which carry the digital data to and from computer system 800, are example forms of transmission media.

The computer system 800 can send messages and receive data, including program code, through the network(s), network link and communication interface 818. In the Internet example, a server might transmit a requested code for an application program through the Internet, the ISP, the local network and the communication interface 818.

The received code may be executed by processor 804 as it is received, and/or stored in storage device 810, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 800.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method comprising:
    configuring a plurality of virtual access points (VAPs) provisioned on a first physical access point (AP) to emulate a network deployment, a given VAP of the plurality of VAPs configured to represent a physical AP of the network deployment;
    configuring roaming parameters for the plurality of VAPs;
    based on the roaming parameter configurations, performing a roaming scenario test using the plurality of VAPs by varying at least one of beacon loss and transmission power over time for at least one of the VAPs of the plurality of VAPs to emulate a client device moving location relative to locations of physical APs of the network deployment; and
    providing a result from the roaming scenario test to a user interface.

2. The method of claim 1, wherein the first physical AP is one of the physical APs of the network deployment.

3. The method of claim 2, wherein the plurality of VAPs are time-multiplexed logical APs provisioned on the first physical AP of the network deployment.

4. The method of claim 2, wherein the plurality of VAPs broadcast the same service set identifier (SSID).

5. The method of claim 2, wherein configuring roaming parameters for the plurality of VAPs comprises configuring a roaming type, a security operations mode, and a roaming trigger for the plurality of VAPs.

6. The method of claim 5, wherein the configured roaming trigger for the plurality of VAPs comprises at least one of an AP transmission power change-based trigger and a beacon loss-based trigger.

7. The method of claim 2, wherein the configurations for the plurality of VAPs are made in response to user input.

8. A system comprising:
    one or more processing resources; and
    a non-transitory computer-readable medium, coupled to the one or more processing resources, having stored therein instructions that when executed by the one or more processing resources cause the system to:
    configure a first group of VAPs to emulate a network deployment, a given VAP of the first group of VAPs configured to represent a physical AP of the network deployment;
    configure a second group of VAPs to emulate the network deployment, a given VAP of the second group of VAPs configured to represent a physical AP of the network deployment;
    configure a first set of roaming parameters for the first group of VAPs and a second set of roaming parameters for the second group of VAPs;
    based on the roaming parameter configurations:
        perform a first roaming scenario test using the first group of VAPs by varying at least one of beacon loss and transmission power over time for at least one VAP of the first group of VAPs to emulate a client device moving location relative to locations of physical APs of the network deployment, and
        perform a second roaming scenario test using the second group of VAPs by varying at least one of beacon loss or transmission power over time for at least one of the VAPs of the second group of VAPs to emulate a client device moving location relative to locations of physical APs of the network deployment; and
    provide a result from the first and second roaming scenario tests to a user interface.

9. The system of claim 8, wherein the first and second group of VAPs are provisioned on a single physical AP.

10. The system of claim 9, wherein the VAPs of the first and second group of VAPs are time-multiplexed logical APs provisioned on the single physical AP.

11. The system of claim 8, wherein:
    configuring the first set of roaming parameters for the first group of VAPs comprises configuring a first roaming type, a first security operations mode, and a first roaming trigger for the first group of VAPs; and
    configuring the second set of roaming parameters for the second group of VAPs comprises configuring a second roaming type, a second security operations mode, and a second roaming trigger for the second group of VAPs.

12. The system of claim 11, wherein the first roaming type comprises at least one of legacy roaming, opportunistic key caching, PMKID caching, and 802.11r roaming.

13. The system of claim 11, wherein the first roaming trigger comprises at least one of an AP transmission power change-based trigger and a beacon loss-based trigger.

14. A non-transitory computer-readable medium storing instructions, which when executed by one or more processing resources, cause the one or more processing resources to:
    configure a plurality of VAPs to emulate a network deployment, a given VAP of the plurality of VAPs configured to represent a physical AP of the network deployment;
    configure roaming parameters for the plurality of VAPs;
    based on the roaming parameter configurations, perform a roaming scenario test using the plurality of VAPs by varying transmission power over time for at least one of the VAPs of the plurality of VAPs to emulate a client device moving location relative to locations of the physical APs of the network deployment; and
    display a result from the roaming scenario test.

15. The non-transitory computer-readable medium storing instructions of claim 14, wherein performing the roaming scenario test using the plurality of VAPs by varying transmission power over time for at least one of the VAPs of the plurality of VAPs comprises varying transmission power over time for each of the VAPs of the plurality of VAPs.

16. The non-transitory computer-readable medium storing instructions of claim 14, wherein the plurality of VAPs are provisioned on a single physical AP of the network deployment.

17. The non-transitory computer-readable medium storing instructions of claim 16, wherein the group of VAPs are time-multiplexed logical APs provisioned on the single physical AP of the network deployment.

18. The non-transitory computer-readable medium storing instructions of claim 14, wherein configuring roaming parameters for the plurality of VAPs comprises configuring a roaming type, a security operations mode, and a roaming trigger for the plurality of VAPs.

19. The non-transitory computer-readable medium storing instructions of claim 18, wherein the configured roaming type comprises at least one of legacy roaming, opportunistic key caching, PMKID caching, and 802.11r roaming.

20. The non-transitory computer-readable medium storing instructions of claim 14, wherein the plurality of VAPs broadcast the SSID.

* * * * *